United States Patent [19]

Leduc

[11] Patent Number: 5,535,938

[45] Date of Patent: Jul. 16, 1996

[54] INTERNAL LINE UP CLAMP

[75] Inventor: Trung Leduc, Houston, Tex.

[73] Assignee: CRC-Evans Pipeline International, Inc., Houston, Tex.

[21] Appl. No.: 230,747

[22] Filed: Apr. 21, 1994

Related U.S. Application Data

[63] Continuation-in-part of Ser. No. 72,928, Jun. 7, 1993, Pat. No. 5,356,067.

[51] Int. Cl.$^6$ .................................................. B23K 37/053
[52] U.S. Cl. ........................ 228/212; 228/49.3; 269/48.1; 269/266
[58] Field of Search ........................... 228/49.3, 45, 212, 228/44.5, 50; 269/27, 32, 48.1, 266

[56] References Cited

U.S. PATENT DOCUMENTS

| | | | |
|---|---|---|---|
| 1,499,989 | 7/1924 | Lehmann | 269/266 X |
| 3,197,195 | 7/1965 | Work et al. | |
| 3,229,972 | 1/1966 | Cunningham | 269/48.1 |
| 3,400,872 | 9/1968 | Rogers . | |
| 3,422,519 | 1/1969 | Fehlman . | |
| 3,425,614 | 2/1969 | Clark . | |
| 3,458,105 | 7/1969 | Valentine . | |
| 3,458,106 | 7/1969 | Valentine . | |
| 3,469,299 | 9/1969 | Rogers . | |
| 3,512,229 | 5/1970 | Phariss . | |
| 3,571,908 | 3/1971 | Pilia et al. . | |
| 3,633,813 | 12/1972 | Lonney et al. . | |
| 3,699,635 | 10/1972 | Bradley et al. . | |
| 3,741,457 | 6/1973 | Gwin et al. . | |
| 3,750,928 | 8/1973 | Valentine . | |
| 3,765,665 | 10/1973 | Work . | |
| 3,920,232 | 11/1975 | Clark . | |
| 3,937,382 | 2/1976 | Cunningham et al. . | |
| 3,979,041 | 9/1976 | Kaneyama et al. . | |
| 4,140,262 | 2/1979 | Wilson et al. . | |
| 4,177,914 | 12/1979 | Clavin | 228/49 B |
| 4,216,896 | 8/1980 | Chang et al. | 228/216 |
| 4,285,458 | 8/1981 | Slavens | 228/49.3 |
| 4,418,860 | 12/1983 | La Force | 228/44.5 |
| 4,556,162 | 12/1985 | Gwin et al. | 228/50 |
| 5,090,608 | 2/1992 | Jones . | |
| 5,110,031 | 5/1992 | Rinaldi | 228/50 |
| 5,356,067 | 10/1994 | Leduc | 228/49.3 |

FOREIGN PATENT DOCUMENTS

| | | | |
|---|---|---|---|
| 0112752 | 12/1983 | European Pat. Off. . | |
| 11591 | 9/1981 | Japan | 228/49.3 |
| 889361 | 12/1981 | U.S.S.R. | 228/44.5 |

*Primary Examiner*—Kenneth J. Ramsey
*Attorney, Agent, or Firm*—Richards, Medlock & Andrews

[57] ABSTRACT

An improved internal line up clamp (10) is disclosed which has an integral back up ring (12). A first set of pipe clamps (22) move radially outward to engage the inner surface of a first pipe (14). A second set of pipe clamps (62) and a set of back up ring segments (202) are simultaneously moved radially outward into engagement with the inner surface of the pipes. The back up ring segments (202) are spring loaded to exert a relatively constant back up force against the inner surface of the pipes at the weld. The back up ring segments support the shoe elements (220). The shoe elements are spring loaded to accommodate diameter mismatch and non-circularity of the pipe ends. The back up ring segments rotate about a radial axis from the pipe centerline. Tapered ends on the back up ring segments provide for the decrease in ring circumference necessary to lower the ring segments.

20 Claims, 9 Drawing Sheets

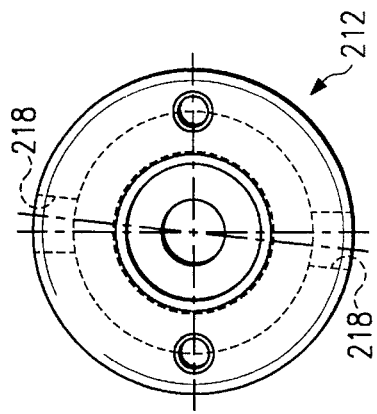
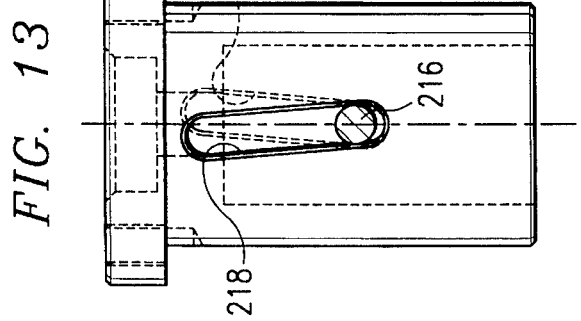
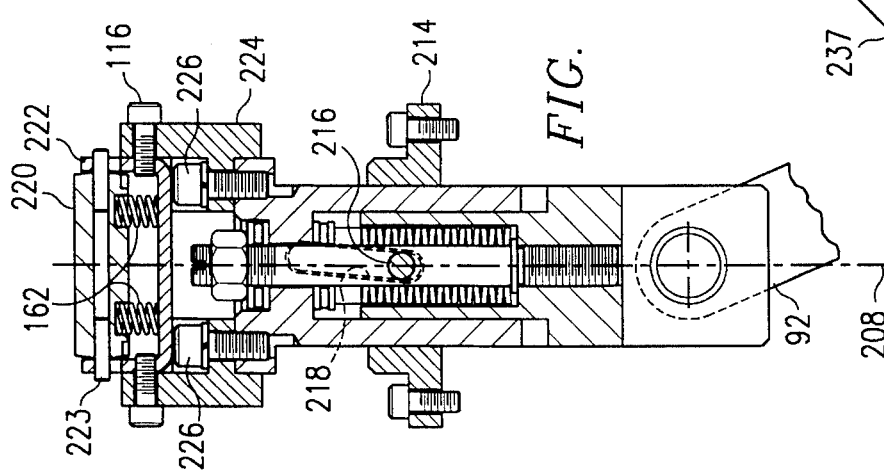
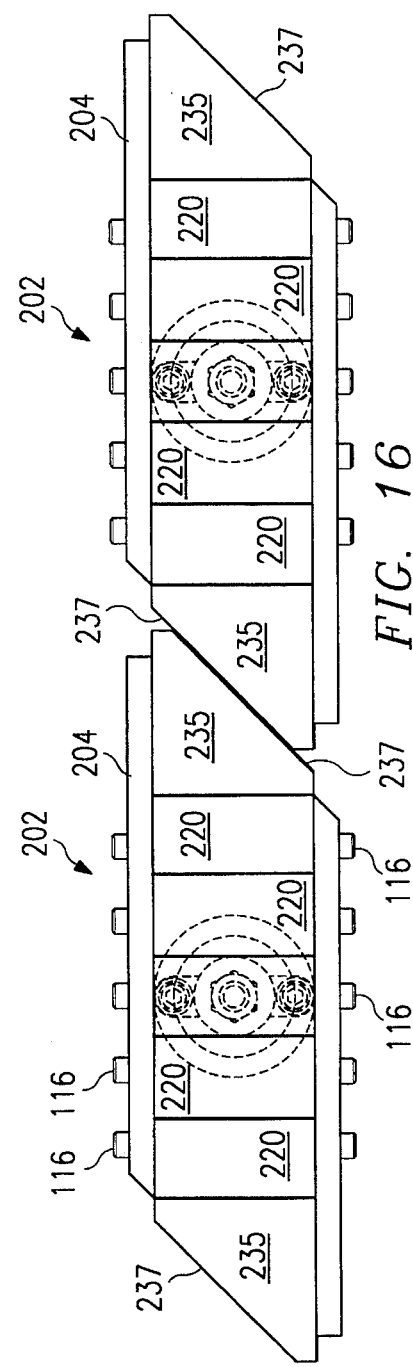

1

INTERNAL LINE UP CLAMP

CROSS REFERENCE TO RELATED APPLICATIONS

This application is a continuation in part of U.S. patent application Ser. No. 72,928 filed Jun. 7, 1993, now U.S. Pat. No. 5,356,067 issued Oct. 18, 1994.

TECHNICAL FIELD OF THE INVENTION

This invention relates to the welding of pipe, and in particular to a clamp to align the pipe for welding with a back up ring at the weld.

BACKGROUND OF THE INVENTION

A pipeline is constructed of pipe sections or pipe lengths which are welded end to end in the field as the pipeline is constructed. The ends of the pipes to be welded must be clamped in close proximity for welding, a task which is complicated as the pipes are commonly out of round and have high and low sections which resist alignment. It is desirable to true the ends before welding. However, on small pipe with heavy 24" diameter pipe with 1" wall thickness, it is difficult to generate the force required to round the pipe.

Internal pipe clamps have been developed for clamping the pipes for welding and attempting to true the ends be welded, such as disclosed in U.S. Pat. No. 3,937,382 to Cunningham et al. issued on Feb. 10, 1976, which has two sets of extendable clamps extendable to clamp to the interior surface of the pipes near the abutting ends of the pipe to be welded. The extendable clamps act to force the pipe into a more circular configuration for welding. However, even after clamping it is common have pipes of different ovalities and slightly different diameters.

The welding is typically conducted by a welding device exterior the abutting pipes. It is desirable to provide a back up ring on the inside surface of the pipes at the weld. U.S. Pat. No. 3,937,382 discloses a back up ring of this type. Also, U.S. Pat. No. 4,556,,162 issued to Gwin et al. on Dec. 3, 1985 discloses a internal pipe clamp with arcuate back up ring segments mounted on certain of the clamping members.

However, a need still exists for a more effective pipe clamp with a back up ring. The clamp should be capable of accommodating the mismatch between pipe ends and be capable of rapid deployment and capable of providing effective clamping.

SUMMARY OF THE INVENTION

In accordance with one aspect of the present invention, an internal line up clamp and back up ring is provided for clamping first and second pipes into proper orientation for welding and to provide a back up ring at the weld. The internal line up clamp includes a frame and a first set of pipe clamps mounted on the frame for movement between a retracted position and a clamping position clamped against the interior surface of the first pipe. Structure is provided for moving the first set of pipe clamps to the clamping position. A second set of pipe clamps is mounted on the frame for movement between a retracted position and a clamping position clamped against the interior surface of the second pipe. A back up ring is mounted on the frame which comprises a plurality of back up ring segments spaced from the second set of pipe clamps. Each back up ring segment is mounted for movement between a retracted position and a back up position urged against the interior surface of the first and second pipes. Structure is provided for simultaneously moving the second set of pipe clamps and the back up ring segments into engagement with the pipe.

In accordance with another aspect of the present invention, the means for moving the second set of pipe clamps and back up ring segments is a double acting air cylinder.

In accordance with another aspect of the present invention, each back up ring segment includes a back up ring shoe, a back up ring base and a spring interconnecting the back up ring shoe and back up ring base, the back up ring shoe contacts the interior surface of the pipes.

In accordance with another aspect of the present invention, each back up ring segment extends only about one inch along the circumference of the interior surface of the pipes.

BRIEF DESCRIPTION OF THE DRAWINGS

For a more complete understanding of the present invention, and the advantages thereof, reference is now made to the following description taken in conjunction with the accompanying drawings, in which:

FIG. 13 is a side view of a rod;

FIG. 14 is a plan view of the rod;

FIG. 15 is a detail end cross-sectional view of a portion of the back up ring; and FIG. 16 is a plan view of two clamp shoes in their mating orientation.

DETAILED DESCRIPTION

Figure 1:
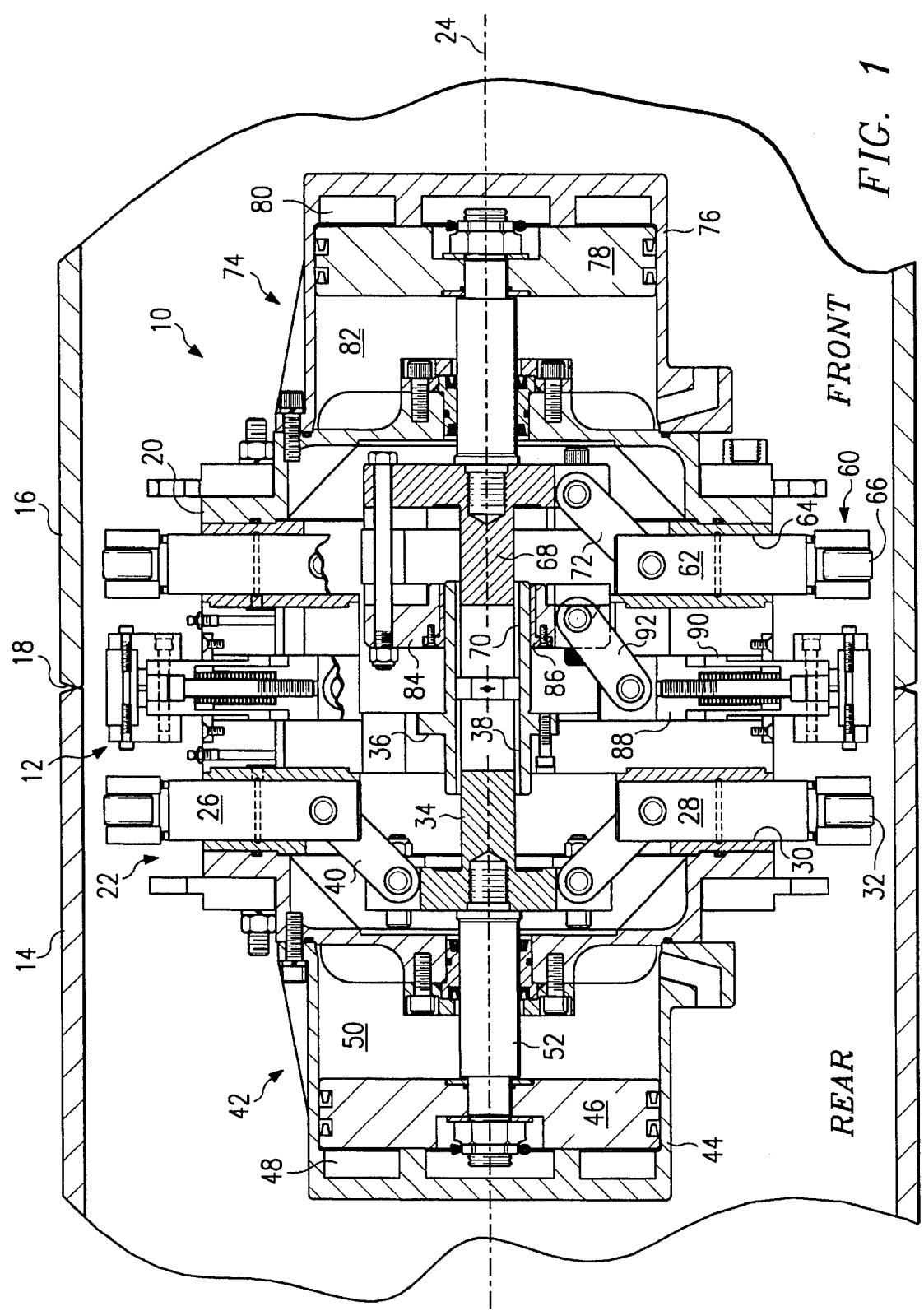
FIG. 1 is a cross sectional view of an internal pipe clamp forming a first embodiment of the present invention.
Figure 2:
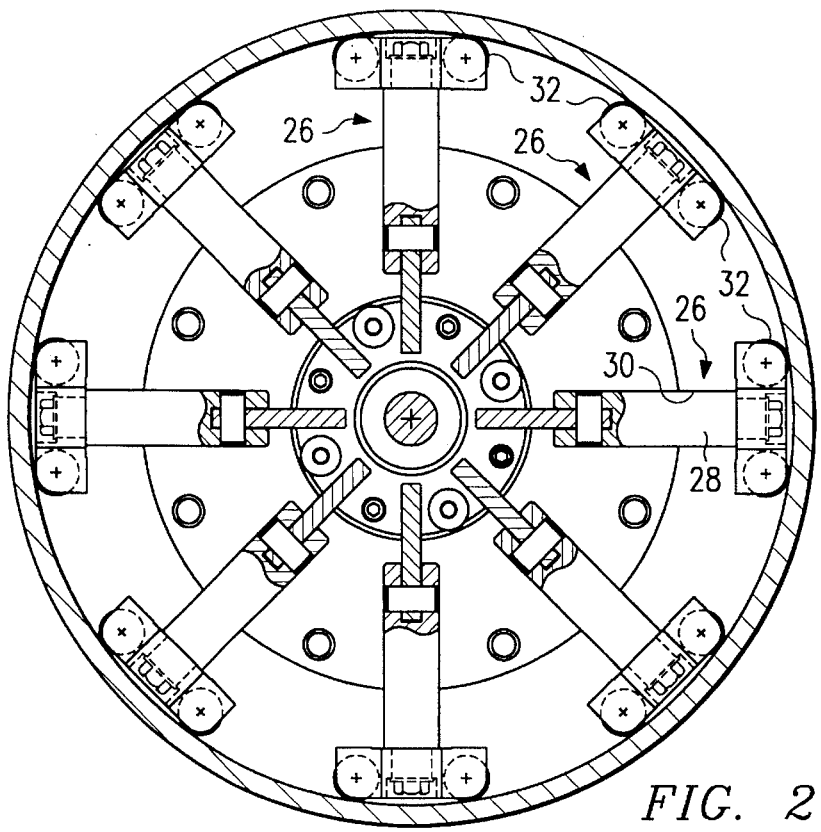
FIG. 2 is a cross sectional view showing a set of pipe clamps in the internal pipe clamp.

With reference now to the accompanying drawings, and in particular to FIG. 1, an internal pipe clamp 10 is illustrated which has an integral back up ring 12. The clamp is used to position adjacent ends of pipe 14 and pipe 16 for welding along the weld groove 18 formed between the abutting ends of the pipe.

The clamp includes a frame 20 which supports a first set of pipe clamps 22 for motion along radial directions from the center line 24 of the frame. Any number of pipe clamps may be utilized, however, eight are illustrated. Each of the individual pipe clamps 26 has a cylindrical body 28 which is slidable within and guided by a cylindrical aperture 30. The radially outermost end of the pipe clamps 26 mount a pair of wheels 32 mounted to the bodies for rotational motion about axes parallel the center line 24. These wheels 32 permit the point of engagement between the interior surface of the pipe 14 to move relative to the pipe clamps as the pipe clamps attempt to deform the end of the pipe into a circular configuration.

A first ring 34 is mounted in the frame and guided for motion along the center line 24 by a guide portion 36 having an annular sleeve 38. Individual pipe clamp links 40 are hinged at one end to the first ring 34 and at the other end to a pipe clamp 26.

A double acting first air cylinder assembly 42 is mounted on the frame for moving the first ring 34 along the center line 24 and thus moving the pipe clamps 26 axially into and out of engagement with the interior surface of the pipe 14. The assembly 42 includes a cylinder 44 which is bolted to the frame. A piston 46 is positioned within the cylinder 44 and defines a first air chamber 48 and a second air chamber 50. A piston rod 52 is mounted on the piston 46 and is in engagement with the first ring 34. When pressurized air is entered into the first air chamber 48 and air vented from second chamber 50, the piston 46 moves to the right as seen in FIG. 1, causing the first ring 34 to move to the right as shown in FIG. 1 and the pipe clamps 26 to move radially outward into engagement with the inner surface of the pipe 14. Similarly, when pressurized air is entered into the second air chamber 50 and air vented from first air chamber 48, the piston 46 will move to the left, as seen in FIG. 1, moving the first ring 34 to the left and retracting the pipe clamps 26 radially inward toward the center line 24 to release the pipe 14.

A second set of pipe clamps 60 is utilized to clamp the pipe 16 at its end. The second set of pipe clamps include a plurality of individual pipe clamps 62, preferably eight, which slide within and are guided by cylindrical apertures 64 in the frame. Each pipe clamp also mounts a pair of wheels 66 for engaging the inner surface of the pipe 16.

A second ring 68 is slidable relative the frame along the center line 24. The second ring 68 is guided within guide portion 36 by an annular sleeve 70. Pipe clamp links 72 are pivoted at their ends to the second ring 68 and the pipe clamps 62. A double acting second air cylinder assembly 74 is mounted on the frame which defines a cylinder 76. A piston 78 is slidably sealed to the inner wall of the cylinder and defines a first air chamber 80 and a second air chamber 82.

A third ring 84 is bolted to the second ring 68 for sliding motion therewith. The third ring 84 mounts an annular sleeve 86 which slides on the exterior of the guide portion 36.

A number of individual back up shoe clamps 88 have cylindrical bodies and are slidable in the frame for radial motion toward and away from the center line 24. The back up shoe clamps 88 slide within and are guided by the frame for radial motion toward and away from the cylinder center line 24. Back up shoe clamp links 92 are pivoted at one end to the third ring 84 and at the other end to each of the back up shoe clamps 88. Thus, when pressurized air is entered into the first air chamber 80, the piston 78 will move both the second ring 68 and third ring 84 to drive the pipe clamps 62 and back up shoe clamps 88 into engagement with the interior surface of the pipes.

Figure 3:
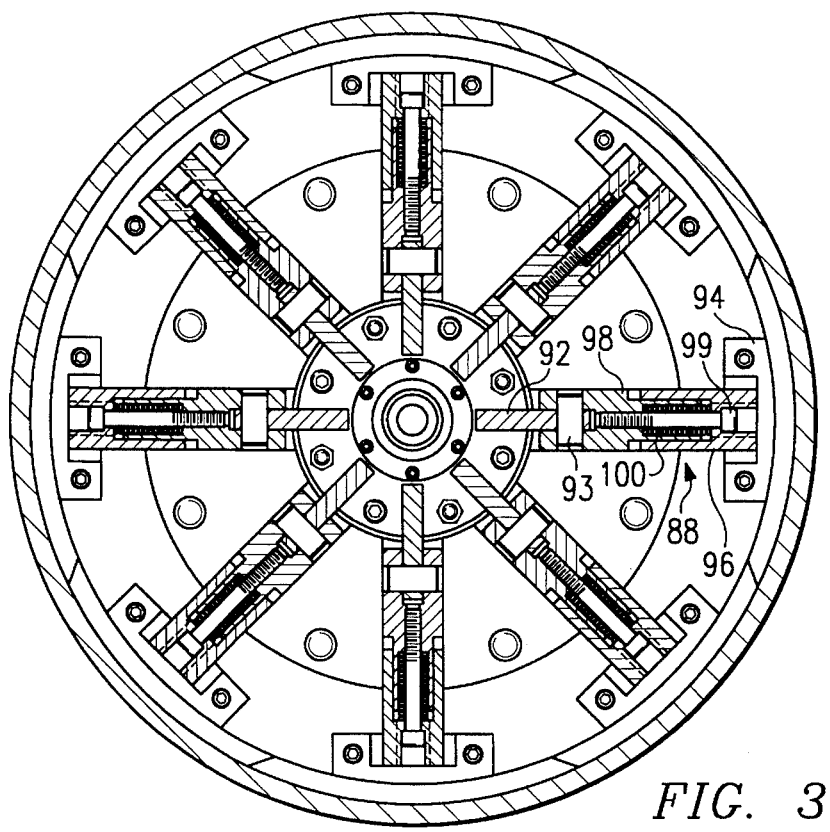
FIG. 3 is a cross sectional view of the back up ring in the internal pipe clamp.

With reference to FIG. 3, the back up shoe clamps 88 can be seen to include a back up shoe 94 bolted to rod 96. Rod 96, in turn, is received on a base 98 and held thereon by a threaded cap screw 99 threaded into base 98. The shoe clamp link 92 is pivotally connected to the base 98 by pin 93. A spring 100 is interposed between the base 98 and the rod 96 to urge the rod and back up shoe 94 either against the head of cap screw 99 or into engagement with the interior surface of the pipes, whichever is closer to the center line 24. The cap screws are adjusted so that the back up shoe 94 would extend about ¼" radially outward from the inner radius of the pipe if the pipe was not present when moved into the engagement position. This provides about ¼" of compression to the spring 100 when the back up shoe 94 is moved into contact with the pipe to preload the back up shoes against the pipe. The cap screws also allow the segment to be adjusted to compensate for a warped pipe end, a variation in pipe end thickness, and high and low sections on the pipe. For example, if the inner surface of a pipe adjacent one clamp is ¼" radially inward from the remainder of the inner surface, the cap screw on that clamp can be screwed in ¼" so that each of the clamps move into contact with the pipe surface more or less simultaneously, and with about equal force. The adjustment also insures the back up shoes 94 will be retracted far enough away from the inner surface of the pipes to allow the pipes to be moved over the pipe clamp 10 without interference.

The springs 100 insure a uniform pressure between the back up shoes 94 and the interior of the pipe when the pipe clamps 62 are in engagement with the interior of the pipe 16. As the pipe clamps 62 are withdrawn radially toward the center line 24 away from the inner surface of the pipe 16, the back up shoes 94 are also simultaneously moved radially toward the center line 24 away from the inner surface of the pipes 14 and 16.

Figure 4:
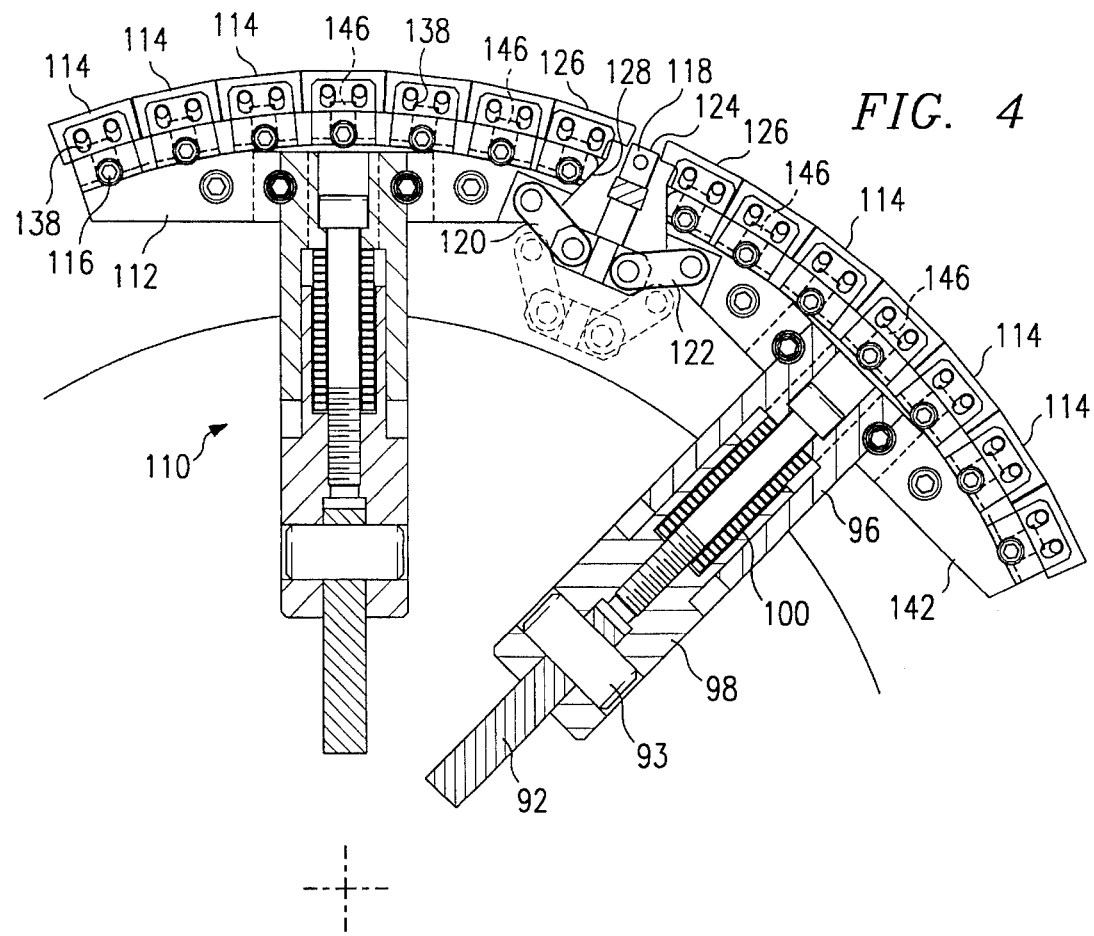
FIG. 4 is a cross sectional view of a modified back up ring.
Figure 5:
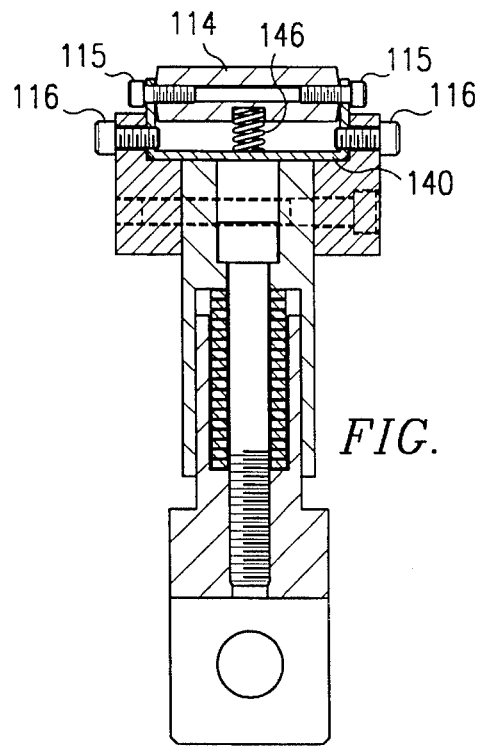
FIG. 5 is a side view of the back up ring of FIG. 4.

With reference now to FIGS. 4 and 5, a modified back up shoe clamp 110 is illustrated. A number of elements of back up shoe clamps 110 are identical to back up shoe clamps 88 and identified by the same reference numerals. However, the backup shoe 112 is made up of a series of individual shoe elements 114, preferably seven as shown in the figures. Each of the shoe elements 114 is individually bolted to a U-shaped plate 140 by four (4) bolts 115. The U-shaped plates 140 are fastened to shoe 112 by two bolts 116.

The bolts 115 each pass through an elongated slot 138 in the U-shaped plate 140 associated with each shoe element 114. The U-shaped plates 140 are, in turn, secured to the arcuate segment 142 by two bolts 116. A helical spring 146 is trapped between the U-shaped plate 140 and each shoe element 114 to urge the shoe elements 114 radially outward as far as permitted by the slots 138. Because the end of the pipes being welded is rarely a perfect circle, the shoe elements 114 will be able to tilt and deflect against the force of spring 146 to the extent permitted by slots 138 to conform to the inner surface of the pipes. Further, if an individual shoe element 114 is solidly welded to the weld, the retraction of the back up shoe will cause the failure of the relatively inexpensive U-shaped plate 140, allowing the clamp 10 to be removed and the welded shoe element 114 to be removed.

A fill block 118 is positioned between adjacent back up shoes 112 and is pivotally connected to each of the adjacent back up shoes by links 120 and 122. As can be seen in the figures, as the back up shoes move radially outward into contact with the inner surface of the pipes, the fill block 118 moves radially outward to a greater extent than the back up shoes so that the outer end 124 of the fill block is level with the outer surface 126 of the shoe elements 114 when engaging the inner surface of the pipes. When the back up shoes 112 are radially retracted toward the center line 24, the linkages force the fill block 118 to move radially inward more quickly past the edges 128 on each back up shoe so that the back up shoes can retract radially inward without interference.

Figure 8:
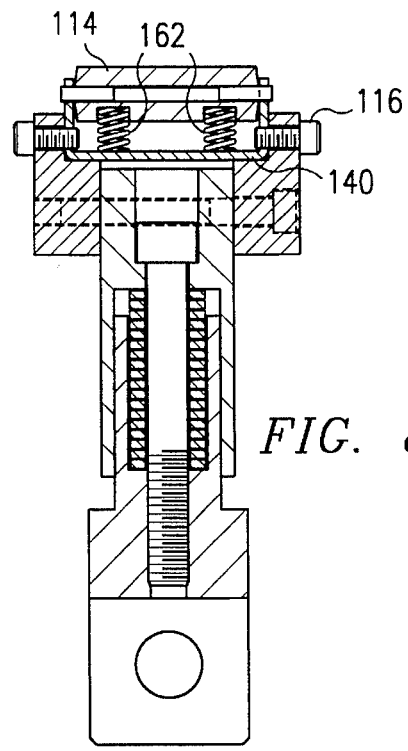
FIG. 8 is a detail view of a portion of the back up ring.
Figure 6:
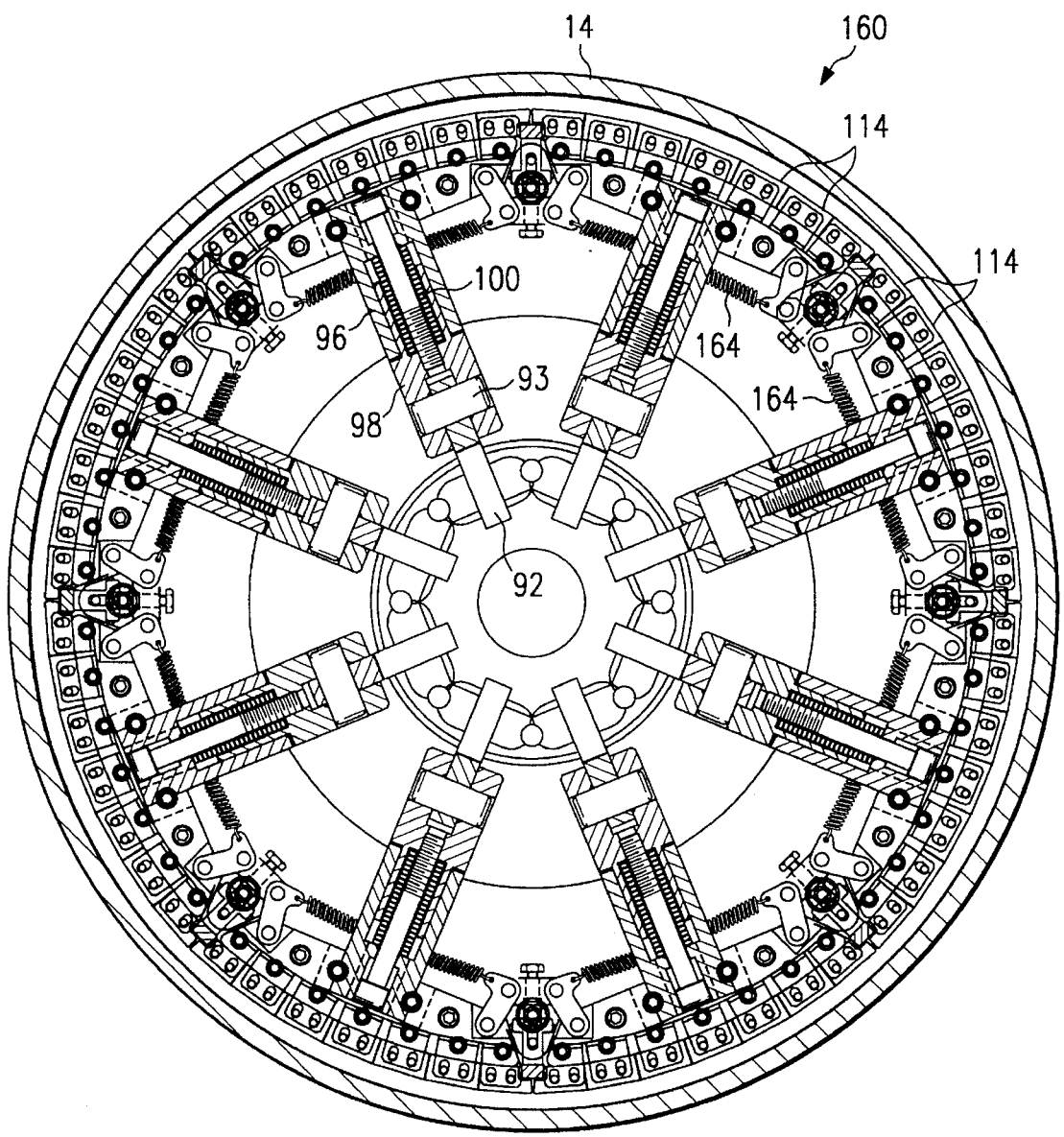
FIG. 6 is a cross sectional view of another modified back up ring in the released position.
Figure 7:
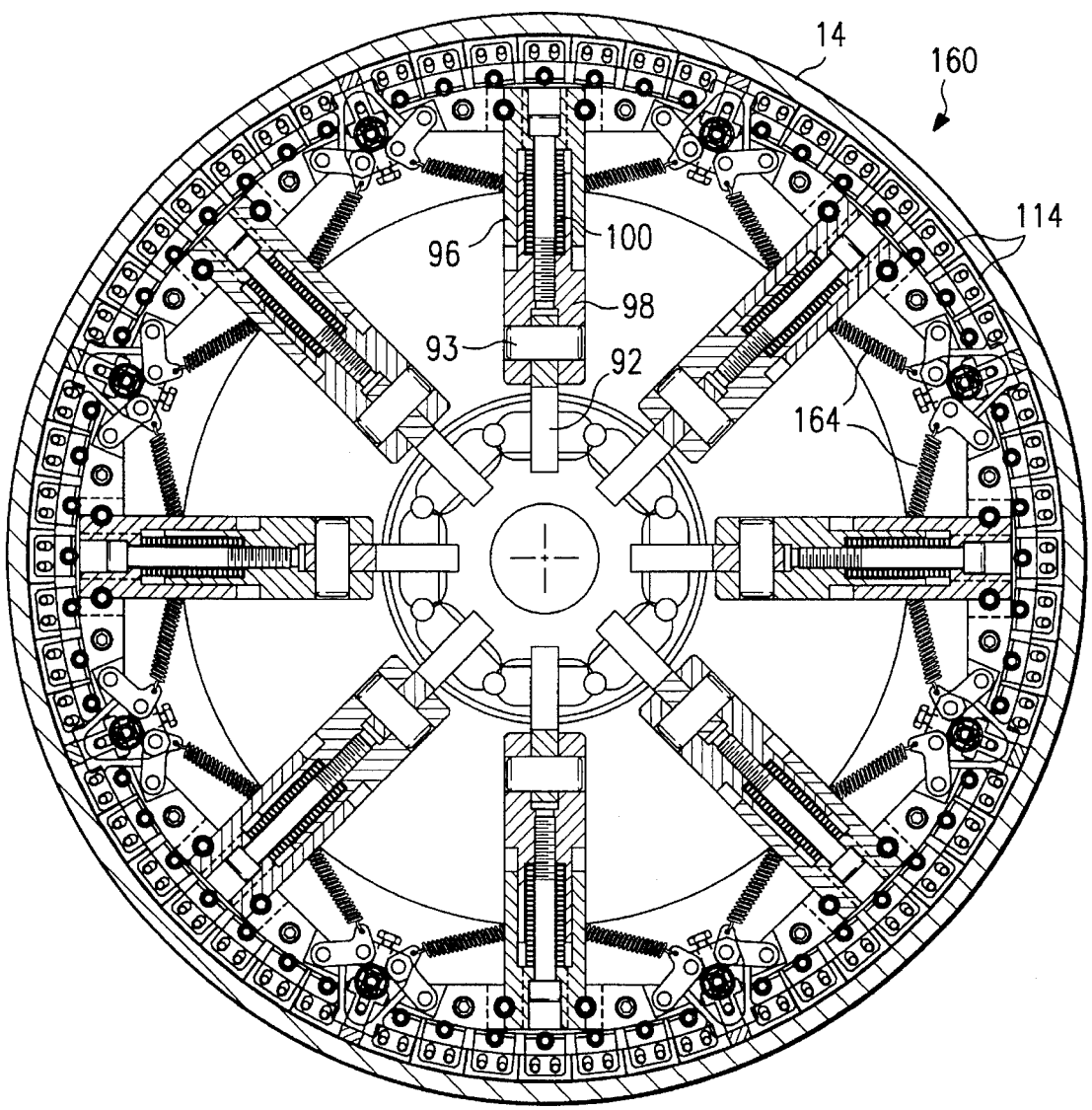
FIG. 7 is a cross sectional view of the back up ring of FIG. 6 with the back up ring engaging the inner surface of the pipes.
Figure 9:
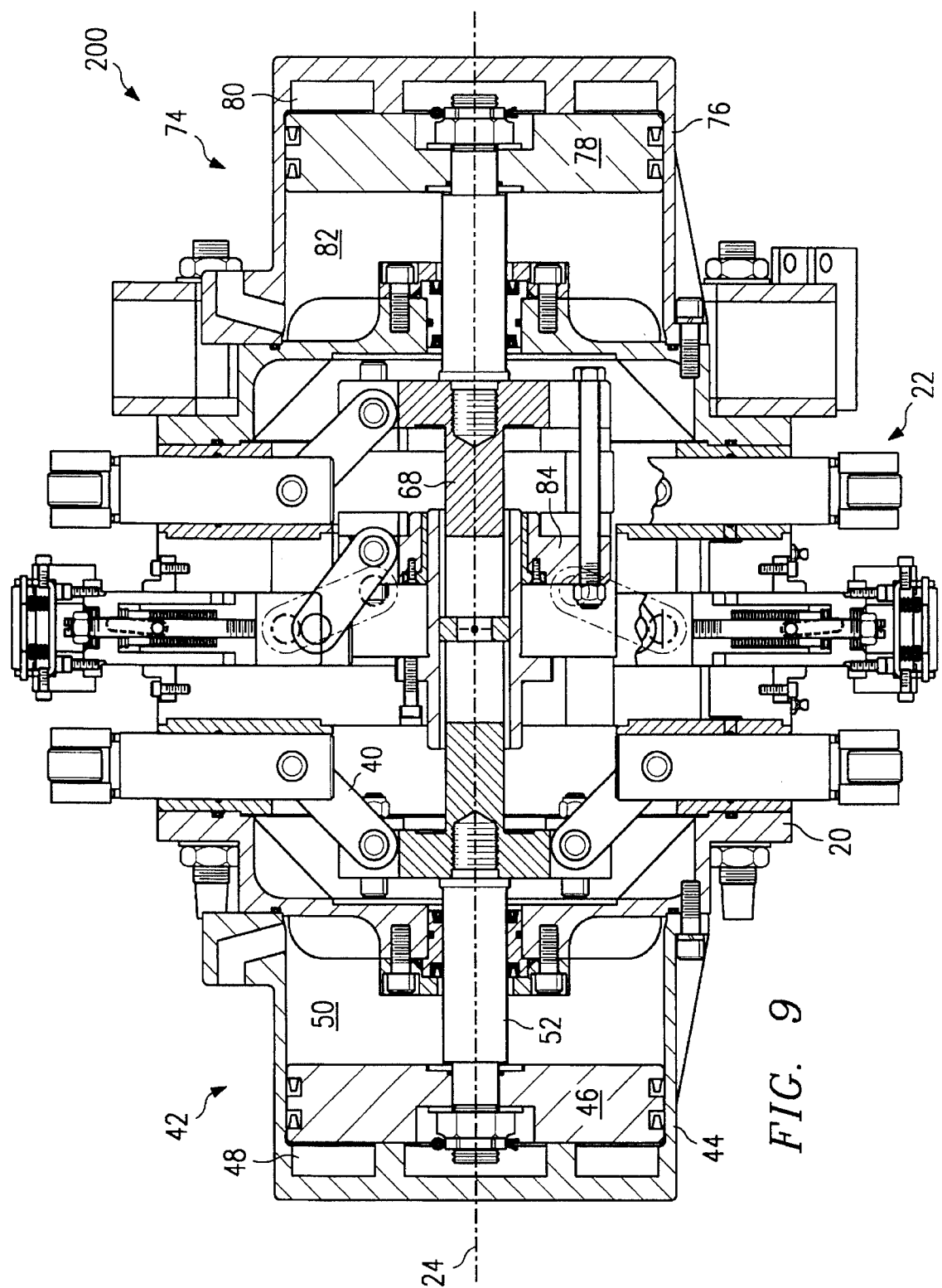
FIG. 9 is a cross-sectional view of an internal pipe clamp forming a second embodiment of the present invention.
Figure 10:
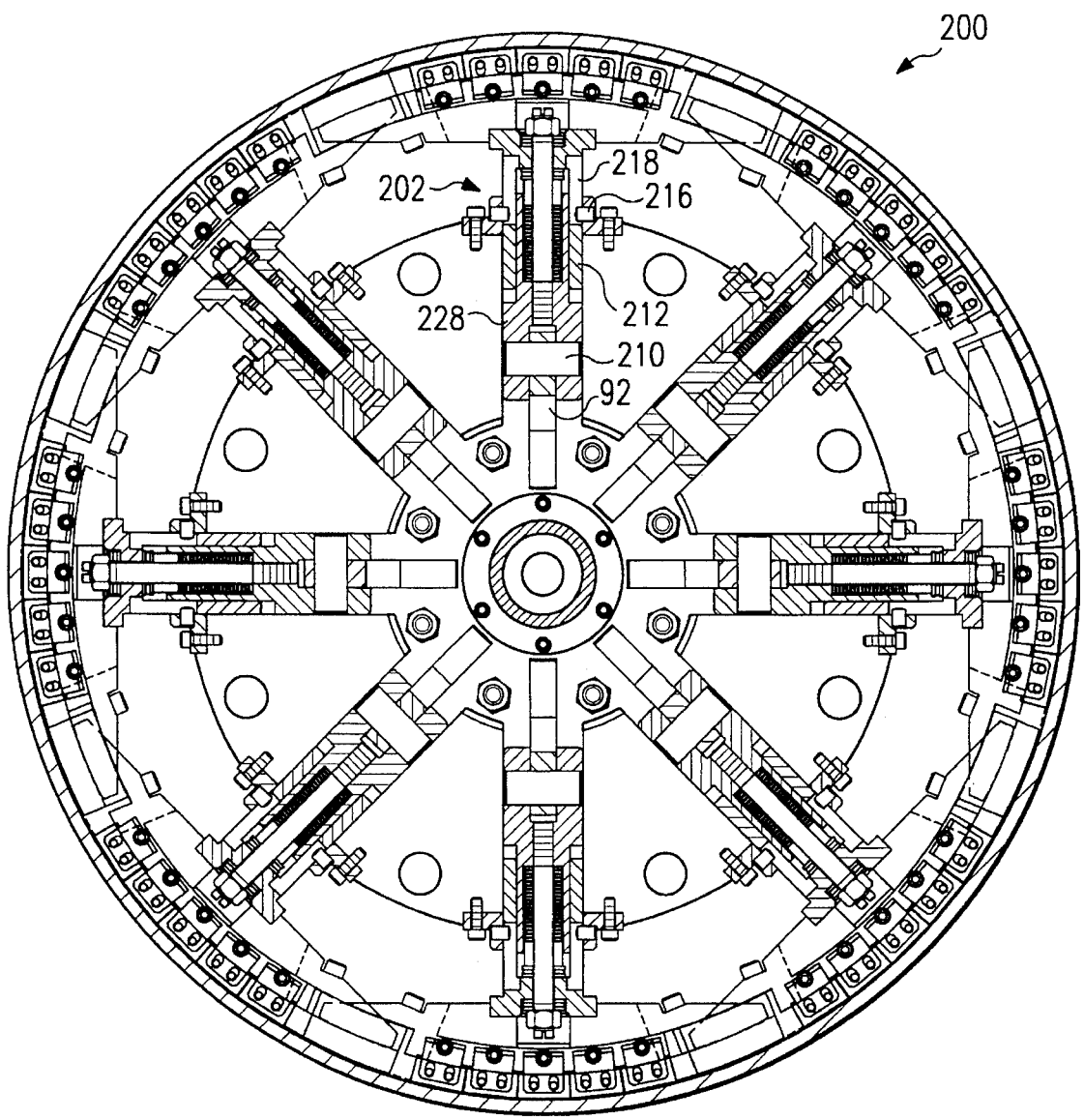
FIG. 10 is a cross-sectional view of the back up ring in the internal pipe clamp of FIG. 9.

With reference to FIGS. 6–8, another modified back up shoe clamp 160 is illustrated. A number of the elements of back up shoe clamp 160 are identical to back up shoe clamp 88 and 110 and are identified by the same reference numeral. As best seen in FIG. 8, the shoe element 114 is urged radially outward by a pair of springs 162, as opposed to the single spring 146 used in back up shoe clamp 110. The springs 162 are mounted side by side toward each end of the shoe element 114 extending along a direction parallel the longitudinal axis of the pipes. In one device constructed in accordance with the teachings of the present invention, each of the shoe elements 114 had a dimension along the axis of the pipes of about 1¾ and a dimension of about one inch along the circumference of the interior surface of the pipes against which the shoes are engaged.

As seen in FIGS. 6 and 7, assist springs 164 help insure retraction of the fill block 118 positioned between each of the back up shoes.

The internal pipe clamp 10 has a number of advantages over prior designs. The pistons 46 and 78 can be exposed to equal pressure in both the first and second chambers. Thus, if a number of the back up shoes are partially welded to the pipe in the welding process, the pistons are likely to provide sufficient retracting force to break the back up shoe free of the pipe. Further, as only air is utilized to expand and retract the various elements, there is no possibility of contamination of the weld site by hydraulic fluid. Further, the air pressure cylinders operate far more quickly than that possible by a hydraulically activated system.

Further, most pipe has a longitudinal seam which projects somewhat inward from the inner surface of the pipe. If a back up segment was a single piece intended to cover a 90° arc or more of the inner circumference of the pipe, the back up segment covering the longitudinal seam would be out of contact with the inner surface along its entire length, except at one end and at the seam. By using shorter segments as done in the present invention, the presence of the seam can only disturb a single segment. Also, since the ends of the pipe to be welded cannot be made perfectly circular even with clamps, the shorter segments have a better opportunity to come into intimate contact with the inner surface of the pipe.

With reference now to FIGS. 9–16, a second embodiment of the present invention is illustrated and is formed by internal pipe clamp 200. Many of the elements of pipe clamp 200 are identical to those used in pipe clamp 10 and are identified with the same reference numeral.

Figure 12:
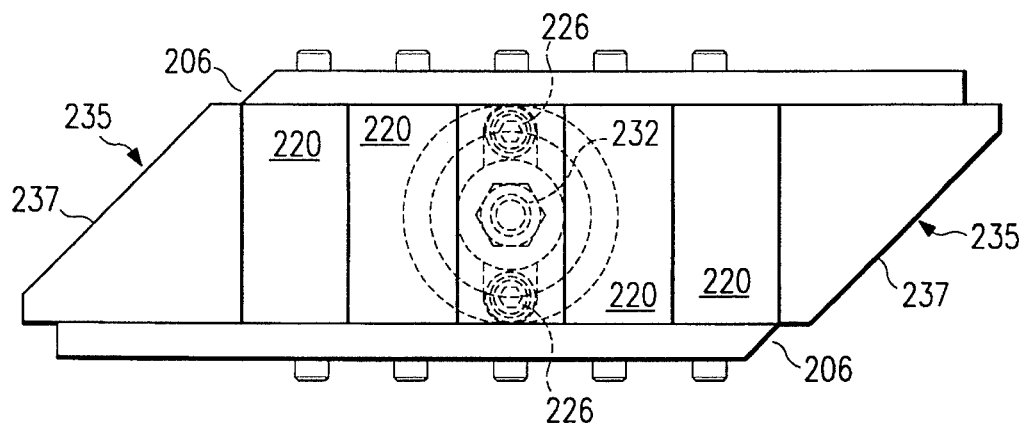
FIG. 12 is a detail plan view of a portion of the back up ring.
Figure 11:
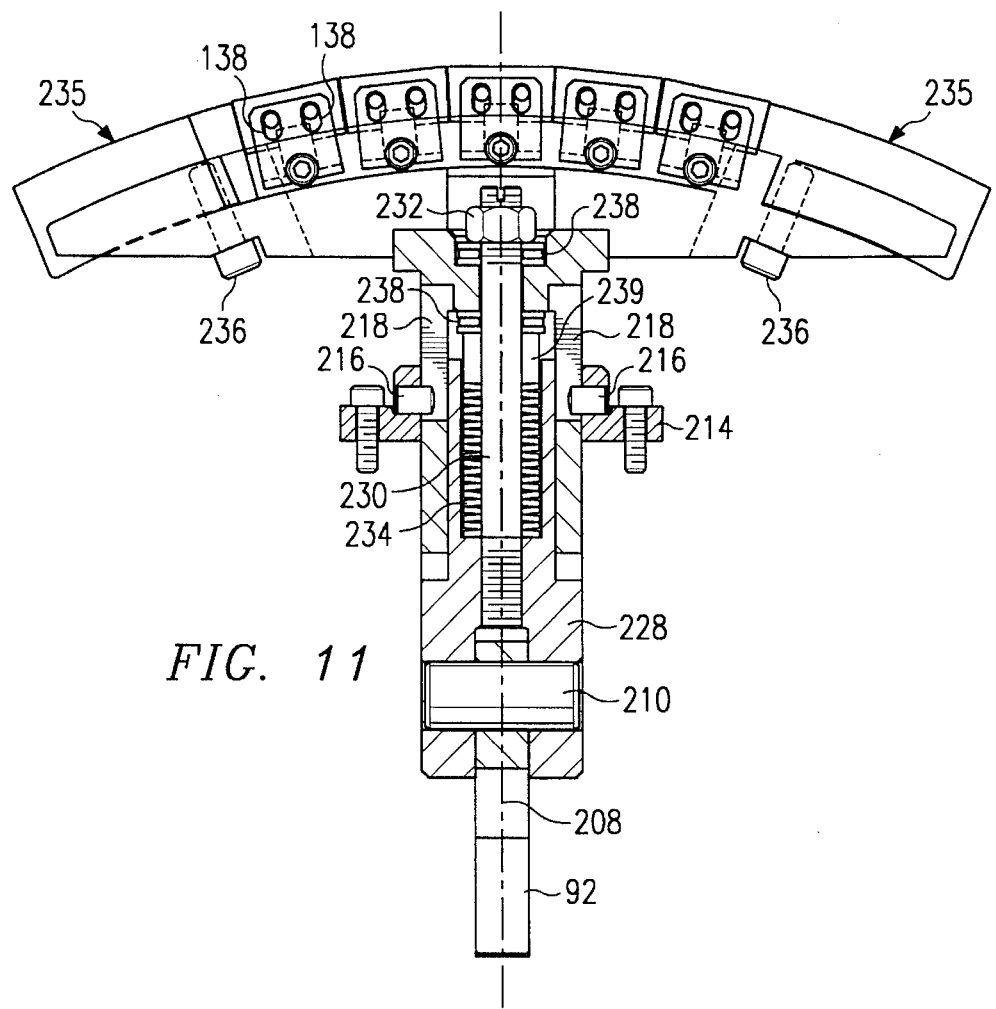
FIG. 11 is a detail side cross-sectional view of a portion of the back up ring.

However, internal pipe clamp 200 is equipped with back up shoe clamps 202 which will rotate about a radial axis 208 from the center line 24 of the pipe as the shoe clamps are moved outwardly to move the back up shoes 204 into contact with the interior surface of the pipes 14 and 16. The back up shoes 204 have tapered ends 206 as seen in FIGS. 12 and 16. When the back up shoes are moved radially outward into contact with the pipe and turned, the adjacent back up shoes are in the orientation as shown in FIG. 16 to firmly clamp the pipes. As the back up shoes move away from the interior surface of the pipes, the shoes are rotated about axis 208 so that the tapered ends of the adjacent back up shoes move away from each other and there is sufficient room to retract the back up shoes away from the pipe.

The link 92 is connected through pin 210 to move the shoe clamps radially. Movement of pin 210 in the radial direction induces radial motion of rod 212. Rod 212 is guided for radial motion within a guide member 214 bolted to the frame 20 of the pipe clamp. The guide member 214 mounts a pair of guide pins 216 which extend into slanted grooves 218 in the rod 212. As the rod 212 is moved radially inwardly and outwardly, these slanted grooves, guided on the guide pins 216, cause rod 212 to rotate a predetermined distance about the axis 208.

The shoe elements 220 are each mounted on a U-shaped plate 222 with four pins 223. The pins 223 can move within slots 138 in U-shaped plates 222 to realize the same advantages as described previously relative to plates 140. U-shaped plates 222 are mounted on shoe 224 by bolts 116. End shoe elements 235 are bolted directly to shoe 224 by bolts 236. End shoe elements 235 have tapered ends 237 matching back up shoe tapered ends 206. As a result, fill blocks 118 are not required. Shoe 224, in turn, is bolted to the rod 212 by bolts 226. Thus, the shoe elements 220 are bolted indirectly to the rod 212 and will rotate with the rod 212 about axis 208.

The pin 210 is mounted within a base 228. A bolt 230 extends from the base 228 and mounts the nut 232 at the end thereof. The rod 212 is supported on the bolt 230 and confined thereon by nut 232. Thrust bearings 238 mount between the nut 232, the rod 212, and a spacer 239 to facilitate rotation of rod 212 around axis 208. A series of spring washers 234 urge the spacer 239 and the rod 212 against the nut 232. This provides the same advantages of spring 100 and bolt 99 discussed previously.

As can be understood, the back up shoe clamps of the internal pipe clamp 200 will automatically turn as they are being retracted to provide sufficient space for the clamps to be retracted. As they are extended into contact with the pipes, they will turn back in alignment again making a continuous line of clamp around the entire inner circumference of the pipes being clamped. This feature allows the back up shoe clamps to come into contact with the pipe I.D. regardless of the pipe wall thickness.

Although one embodiment of the invention has been illustrated in the accompanying drawings and described in the foregoing detailed description, it will be understood that the invention is not limited to the embodiment disclosed, but is capable of numerous rearrangements, modifications and substitutions of parts and elements without departing from the spirit and scope of the invention.

We claim:

1. An internal line up clamp and back up ring for clamping first and second pipes in proper orientation for welding and providing a back up ring at the weld, the pipes having a center axis, comprising:

a frame;

a first set of pipe clamps mounted on the frame for movement between a retracted position and a clamping position clamped against the interior surface of the first pipe;

a first mechanism for moving the first set to the clamping position;

a second set of pipe clamps mounted on the frame for movement between a retracted position and a clamping position clamped against the interior surface of the second pipe;

a back up ring mounted on the frame comprising a plurality of back up ring segments spaced from the second set of pipe clamps, each back up ring segment for movement between a retracted position and a back up position urged against the interior surface of the first and second pipes, each back up ring segment having at least one u-shaped plate mounted thereon, the u-shaped plate having a plurality of elongate slot therein elongated in a direction along a radial line from the center axis of the pipes, and at least one shoe element, bolts fastened to the shoe element and passing through the elongate slots to permit limited motion of the shoe element relative to the u-shaped plate and at least one spring mounted between the u-shaped plate and the shoe element to urge the shoe element in the radially outward direction; and a second mechanism for simultaneously moving the second set of pipe clamps and the back up ring into engagement with the pipes.

2. The internal line up clamp of claim 1 wherein said first and second mechanisms for moving are double acting air cylinders.

3. The internal line up clamp of claim 1 wherein the back up ring segments each include a plurality of u-shaped plates and shoe elements.

4. The internal line up clamp of claim 3 wherein the shoe elements have a length of about six inches.

5. The internal line up clamp of claim 3 wherein the length of the shoe element is about one inch.

6. The internal line up clamp of claim 1 further having a fill block pivotally attached to adjacent back up ring segments to fill the gap between the back up ring segments as the back up ring segments are engaged with the interior surface of the pipes.

7. An internal line up clamp and back up ring for damping first and second pipes in proper orientation for welding and providing a back up ring at the weld, comprising:

a frame;

a first set of pipe clamps mounted on the frame for movement between a retracted position and a clamping position clamped against the interior surface of the first pipe;

a mechanism for moving the first set to the clamping position;

a second set of pipe clamps mounted on the frame for movement between a retracted position and a clamping position clamped against the interior surface of the second pipe;

a back up ring mounted directly on the frame comprising a plurality of back up ring segments spaced from the second set of pipe clamps and guided by the frame, each back up ring segment for movement between a retracted position and a back up position urged against the interior surface of the first and second pipes;

each of said back up ring segments including a base moveably mounted to the back up ring, a rod for radial movement relative to the base, a bolt threadedly received in the base to limit the radial motion of the rod and a spring interposed between the base and the rod to urge the rod in the radially outward direction, said back up ring segment further having a u-shaped member mounted thereon, the u-shaped member having a plurality of radially extending elongated slots and a shoe element mounted to the u-shaped member through the slots permitting the shoe element to move radially relative to the u-shaped member and at least one spring interposed between the u-shaped member and the shoe element to urge the shoe element radially outward; and a mechanism for simultaneously moving the second set of pipe clamps and the back up ring segments into engagement with the pipes.

8. The internal line up clamp of claim 7 wherein said mechanisms for moving are double acting air cylinders.

9. The internal line up clamp of claim 7 wherein the back up ring segments include a plurality of u-shaped members and shoe elements.

10. The internal line up clamp of claim 9 wherein the shoe elements have a length of about six inches.

11. The internal line up clamp of claim 9 wherein the length of the shoe element is about one inch.

12. The internal line up clamp of claim 7 further having a fill block pivotally attached to adjacent back up ring segments to fill the gap between the back up ring segments as the back up ring segments are engaged with the interior surface of the pipes.

13. The method of installing an internal line up clamp and back up ring in a first and second pipe to clamp the pipes in alignment for welding and provide a back up ring at the weld comprising the step of:

positioning the frame within the interior of the first and second pipes at adjacent ends of the pipes;

extending a first set of pipe clamps mounted on the frame against the interior surface of the first pipe to clamp the internal line up clamp to the first pipe; and simultaneously extending a second set of pipe clamps into engagement with the inner surface of the second pipe and extending a plurality of back up ring segments into engagement with the inner surface of the pipes at the weld, the back up ring segments being spaced from the second set of pipe clamps, said back up ring segments each including a base and a rod mounted on the base for motion along a radial axis centered on the center axis of the first and second pipe, a bolt threaded into the base limiting the radially outward movement of the rod, a spring mounted between the base and the rod urging the rod in the radially outward direction, the rod supposing at least one u-shaped plate, a shoe element mounted to the u-shaped plate through elongate slots on the u-shaped plate extending in the radial direction, a second spring mounted between the u-shaped plate and the shoe element to urge the shoe element in the radially outward direction, the first and second springs being resiliently deformed as the back up ring segments are extended into engagement with the inner surface of the pipes to insure that the shoe elements engage the pipes with uniform force.

14. The method of claim 13 further comprising the step of filling the gap formed between adjacent back up ring segments moved into engagement with the inner surface of the pipes with a fill block pivotally secured to the adjacent back up ring segments.

15. An internal line up clamp and back up ring for clamping first and second pipes in proper orientation for welding and providing a back up ring at the weld, comprising:

a frame;

a first set of pipe clamps mounted on the frame for movement between a retracted position and a clamping position clamped against the interior surface of the first pipe;

a mechanism for moving the first set to the clamping position;

a second set of pipe clamps mounted on the frame for movement between a retracted position and a clamping position clamped against the interior surface of the second pipe;

a back up ring mounted on the frame comprising a plurality of back up ring segments spaced from the second set of pipe clamps, each back up ring segment for movement between a retracted position and a back up position urged against the interior surface of the first and second pipes, the back up ring segments rotating about a radial axis from the center line of the pipes as the back up ring segments move between the retracted position and the back up position;

each back up ring segment including a base and a rod mounted on the base for motion along the radial axis and about the radial axis relative to the base, a guide member mounted to the frame and having at least one guide pin mounted thereon engaging a groove formed in the rod, the groove extending at an angle relative to the radial axis; and a mechanism for simultaneously moving the second set of pipe clamps and the back up ring into engagement with the pipes.

16. The internal line up clamp and back up ring of claim 15, wherein the guide member mounts a pair of opposed guide pins, each pin engaging one of a pair of opposed grooves in the rod.

17. The internal line up clamp and back up ring of claim 15, wherein a bolt member is fastened to the base to limit the radial outward motion of the rod and a spring element is interposed between the base and the rod to urge the rod in the radially outward direction.

18. The internal line up clamp and back up ring of claim 15, wherein the back up ring segment mounts at least one u-shaped plate, the u-shaped plate having a plurality of elongated slots elongated in the direction of the radial axis and at least one shoe element, the shoe element mounted to the u-shaped plate through the elongated slots permitting limited movement of the shoe element relative the u-shaped plate and a spring interposed between the u-shaped plate and the shoe element to urge the shoe element in the radially outward direction.

19. The internal line up clamp and back up ring of claim 18, wherein the back up ring segment mounts a plurality of shoe elements thereon, the shoe elements at each end of the back up ring segment being tapered to engage a shoe element on the adjacent back up ring segment.

20. The internal line up clamp and back up ring of claim 1, wherein a pair of springs are mounted between the u-shaped plate and the shoe element to urge the shoe element in the radially outward direction.

* * * * *

UNITED STATES PATENT AND TRADEMARK OFFICE
CERTIFICATE OF CORRECTION

PATENT NO. : 5,535,938
DATED : July 16, 1996
INVENTOR(S) : Trung Leduc

It is certified that error appears in the above-indentified patent and that said Letters Patent is hereby corrected as shown below:

Col. 1, line 24, after the word "heavy" insert the words --walls, e.g.,--.

Col. 5, line 17, after 1¾" insert a --"--.

Col. 7, line 3, delete the word "slot" and insert the word --slots--.

Col. 7, line 30, delete the word "damping" and insert the word --clamping--.

Signed and Sealed this

Twenty-second Day of October, 1996

Attest:

BRUCE LEHMAN

*Attesting Officer*      *Commissioner of Patents and Trademarks*